(12) United States Patent
Kuper

(10) Patent No.: US 6,749,712 B2
(45) Date of Patent: Jun. 15, 2004

(54) METHOD OF UTILIZING SOL-GEL PROCESSING IN THE PRODUCTION OF A MACROSCOPIC TWO OR THREE DIMENSIONALLY ORDERED ARRAY OF SINGLE WALL NONOTUBES (SWNTS)

(75) Inventor: Cynthia A. Kuper, Philadelphia, PA (US)

(73) Assignee: Nano Dynamics, Inc., Buffalo, NY (US)

( * ) Notice: Subject to any disclaimer, the term of this patent is extended or adjusted under 35 U.S.C. 154(b) by 244 days.

(21) Appl. No.: 09/938,287

(22) Filed: Aug. 23, 2001

(65) Prior Publication Data

US 2002/0092613 A1 Jul. 18, 2002

Related U.S. Application Data

(60) Provisional application No. 60/227,184, filed on Aug. 23, 2000.

(51) Int. Cl.[7] .................................................. D01F 9/12
(52) U.S. Cl. ..................... 156/296; 423/447.2; 423/460; 264/108
(58) Field of Search ....................... 156/296; 423/447.1, 423/447.2, 460, 461; 264/108

(56) References Cited

U.S. PATENT DOCUMENTS

| | | | | |
|---|---|---|---|---|
| 6,203,814 B1 | * | 3/2001 | Fisher et al. ................. | 424/443 |
| 2002/0159943 A1 | * | 10/2002 | Smalley et al. ........... | 423/447.1 |
| 2003/0089893 A1 | * | 5/2003 | Niu et al. .................... | 252/500 |

* cited by examiner

*Primary Examiner*—Sam Chuan Yao
(74) *Attorney, Agent, or Firm*—Morgan, Lewis & Bockius LLP

(57) ABSTRACT

A method for fabricating of macroscopic two or three dimensionally ordered arrays of single wall nanotubes (SWNTs) comprising the following steps: chemically treating purified SWNTs using the sol gel process to add chemically reactive groups to either the tube ends or tube bodies in order to functionalize the SWNTs; suspending the functionalized SWNTs in an appropriate liquid medium such that a colloid is produced; treating the colloid with a chemical or heat to promote coupling of the individual functionalized SWNTs to each other; and heating the coupled SWNTs to evaporate any excess liquid so as to provide a final product comprising an array of covalently bound functionalized SWNTs.

5 Claims, 2 Drawing Sheets

Synthesis flow chart

METHOD OF UTILIZING SOL-GEL PROCESSING IN THE PRODUCTION OF A MACROSCOPIC TWO OR THREE DIMENSIONALLY ORDERED ARRAY OF SINGLE WALL NONOTUBES (SWNTS)

CLAIM OF PRIORITY

This application claims the priority of co-pending provisional application No. 60/227,184 filed Aug. 23, 2000 entitled Method for Utilizing Sol-Gel Processing in the Production of a Macroscopic Two or Three Dimensionally Ordered Array of Single Wall Nanotubes (SWNTs).

FIELD OF THE INVENTION

The Invention relates to the field of materials science and materials fabrication comprising carbon nanotubes.

BACKGROUND OF THE INVENTION

Carbon is a critical element of organic material, which makes up all living matter. Matter composed solely of carbon exists in the form of graphite, diamond and most recently the fullerenes. These forms are called allotropes and are chemically very stable. Allotropes of carbon can be used alone, or in combination with other materials to form composites, to make applicable materials such as industrial diamonds; for cutting tools and flat panel displays, carbon filaments; in the form of fibers for structural reinforcement and dielectrics, activated carbon; for filtration devices, electrode materials for the manufacturer of steel, construction materials; for insulation of nuclear reactors, and graphite rods; for high-temperature hearing elements.

With the discovery of the third allotrope of carbon, the fullerenes, carbon materials having a fine tubular structure within the order of a nanometer in diameter, have been discovered on a carbon rod after an arc discharge, a common way of producing carbon fullerenes (S. Iijima, Nature, Vol. 354, pp. 56–58, Nov. 7, 1991). These fibrilar carbon materials may be visualized by (a) providing benzene shell-like hexagonal molecules as a constituent unit which are formed by covalent bonding of carbon atoms, (b) placing the molecules tightly in a plane to form a carbon molecule sheet, (c) rolling the carbon molecule sheet into a cylindrical shape to form a cylindrical carbon tube as a unit or a high-molecular building block, (d) repeating the above steps (a)–(c) to form a plurality of cylindrical carbon tubes having different diameters, and thereafter (e) arranging their cylindrical carbon tubes in a concentric configuration to form a telescopic structure.

The above-mentioned cylindrical tubes have an extreme micro-diameter of the order of 1 nm at a minimum, and the spacing between a cylindrical tube and its inside cylindrical tube or its outside cylindrical tube is of the order of 0.34 nm which is approximately the same as the interlayer spacing of a graphite molecule. The interaction between tubes is van der Waals type, and electron transfer from tube to tube is very small. In the above-mentioned telescopic structure, there are various kinds of structure such as a double structure, triple structure, quadruple structure, quintuple structure.

The above fibrilar carbon material will be hereinafter referred to in some cases as a "(carbon) nanotube" or a "(carbon) tube". Carbon nanotubes can take an almost infinite number of structures, which are characterized both by their diameter and their degree of helicity. The relation between the molecular structure and electronic band structure of the carbon nanotube has been taught in Japanese Patent Application No. 56306/1992 which was laid open on Sep. 7, 1993 under Japanese Unexamined Patent Publication No. 229809/1993, the disclosure of which is hereby incorporated by reference herein. In addition, a method of fabricating carbon tube devices having desired properties on the basis of the above relation has been proposed therein.

The above application No. 56306/1992 and N. Hamada et al., Phys. Rev. Lett., 68(10), pp. 1579–1581(1992) teach that the carbon nanotubes exhibit a variety of properties in electronic conduction from a metal to a semiconductor having various band gaps, depending on the radius of the cylindrical tube and the degree of helical arrangement of the six-membered carbon rings (i.e. the carbon hexagons), further, that the carbon nanotubes are useful as a material for use in functional devices utilizing such properties.

On the other hand, soccer ball-like spherical high-molecular weight carbon materials having benzene shell-like hexagonal molecules as a constituent unit or molecular building block are taught in S. Iijima et al., Nature, Vol. 356, pp. 776–778(1992). S. Iijima et al. have shown that a variety of complex variants of carbon nanotubes are obtained by introducing pentagons and heptagons into the hexagonal network. Also, it is known that the molecules such as C.60, C.70, C.78, C.82, can exist in a stable state. These soccer ball-like spherical carbon materials are in the solid state or in the form of a face-centered cubic lattice or any other crystal structures depending on van der Waals forces. If the crystal or solid material is doped with K, Rb, Cs or the like, the doped material exhibits the metal conduction and superconductivity at low temperature.

The above-mentioned carbon nanotube and soccer ball-like materials and high-molecular weight materials derived from either of them are thus well known. Carbon nanotubules have received a great attention as a new base material applicable to various industries. The teachings of U.S. Pat. No. 5,457,343, for example, discloses the use of a carbon nanotubule as an absorbent or complex enclosure for foreign materials.

Graphite is a layered material and is structured with the carbon hexagons spread out two dimensionally and repeated forming layers of graphite sheets. The methods of making graphite carbon materials have been well established and are being used by industry for mass production of graphite. The methods of making normal graphite materials are divided into three main types. There is a method of forming graphite using a liquid-phase carbonization process with ground coke and a bonding material as raw materials. There is a method which uses a solid-phase carbonization process using spun polyacrylonitrile, pitch and rayon filaments as they are, and there is a method which thermally decomposes hydrocarbon gases and then performs a gas-phase carbonization process.

Of the carbon materials with graphite type structure, graphite filaments could have been obtained by using the solid-phase carbonization method mentioned above, or could have been formed by thermal decomposition of hydrocarbon gases using metallic granules as a catalyst, or could have been obtained by forming amorphous carbon filaments using metallic granules as a catalyst and then heat-treating these filaments to make graphite. Also, a method is known of where needle shaped graphite could have been grown by applying a direct current discharge between two graphite electrodes in a rare gas atmosphere.

For example, one of the prior methods of growing the graphite filaments was proposed in 1960 by Roger Bacon of Union Carbide Co. (U.S.A.) (J. Appl. Phys., Vol. 31, p. 283

(1960)), and in this method direct current is discharged between two carbon-rod electrodes in an argon gas atmosphere at approximately 90 atmospheres, forming graphite filaments with a diameter of 1 to 5 .mu.m and length of 2 to 3 cm on the negative electrode. Using this method, the crystal structure of the resulting graphite filament is the same as that of normal graphite. In other words, each of the graphite filaments is structured with several oblong shaped single crystal graphite bundled around the filament axis, and each oblong graphite crystals bond together along the crystal boundaries to form a polycrystalline structure.

As mentioned above, the chemical and physical properties of carbon materials taking currently known graphitic structures as the main structural unit are well known. When considering more diverse industrial applications of carbon, a new carbon carbon-based material having a new structure is desired.

Carbon nanotubes have been refined so that they can be can be synthesized as single wall nanotubes (SWNTs.) SWNTs are micron long nanometer diameter tubes composed solely of carbon atoms. The geometrical arrangement of the carbon atoms in a SWNT is that of graphene (a single sheet of graphite). The overall configuration resembles a sheet of chicken wire, which is rolled to close seamlessly and capped with hemispheres on each end of the tube. In each vertice of the hypothetical chicken wire exists a carbon atom. This provides the graphene configuration. SWNTs are proposed to be 100 times stronger than steel at ⅙ the weight. SWNTs have the highest strength to weight ratio of any material known today. They can have conductivities of a metal or a small gap semiconductor, parallel to the tube axis. Perpendicular to the tube axis they are completely insulating and have thermal properties similar to diamond. These remarkable properties are entirely anisotropic and therefore rely on the SWNTs to be completely aligned with respect to one another.

While carbon nanotubes and SWNTs have been known, there has heretofore been no known way to produce an ordered array of SWNTs. The term "ordered array" defines a periodic architecture composed of SWNTs aligned with respect to one another in either a parallel or perpendicular configuration. Such a parallel configuration would have all the tubes aligned along the tube axis and would be considered a two dimensional array. A perpendicular configuration would have an alternating structure of every other tube aligned parallel to the tube axis with tubes in between lying perpendicular and would be considered a three dimensional array. These architectures would allow for the full exploitation of all the properties, electrical and mechanical, of a SWNT in bulk.

Such macroscopically aligned arrays of SWNTs produced via this methodology have applications towards structural reinforcement materials such as those in automobile panels, airplane fuselage structures, as well as maritime and aerospace technologies. Applications also include those for biotechnology such as use in synthetic membranes and skins. Fiber processing of SWNTs can also be achieved using this method.

The sol gel process is a known chemical protocol that involves initially a sol, a sub micron solid particle forming a colloidal suspension in a liquid, Secondly, an additive which gels the sol, usually a chemical that promotes condensation of more than one solid particle to itself, Thirdly: a heat treatment period which evaporates the liquid. The final result is a thin (<1 um) or thick film (>1 um) of a dimensionally ordered solid array.

Sol gel processing as described above is principally used in the ceramic industry. It is a well known and reliable method for making high temperature ceramic composites and ceramic films. It is a significant technique in that it allows one to process solid particles using wet chemistry. This lends control and precision in the development of the final product. Insoluble particles are traditionally hard to process. Sol gel processing provides a powerful solution to these processing limits.

The use of sol gel processing, heretofore, has not been applied to SWNTs. SWNTs are not soluble in any liquid and this causes the material to have many processing limits. Sol Gel processing of SWNTs will over come these barriers and allow the material to be used for the many applications previously mentioned.

It is the fundamental purpose of the present invention to provide a method for fabricating two or three dimensionally order arrays of SWNTs using sol gel processing.

SUMMARY OF THE INVENTION

In accordance with the present invention, a method for fabricating of macroscopic two or three dimensionally ordered arrays of single wall nanotubes (SWNTs) is disclosed. The first embodiment of the invention comprises the following steps: chemically treating purified SWNTs using known laboratory protocols, comprised of standard organic chemistry techniques, to add chemically reactive groups (functional groups) to either the tube ends or tube bodies in order to functionalize the SWNTs; applying the sol-gel process to these functionalized carbon nanotubes, which is comprised of the following steps; suspending the functionalized SWNTs in an appropriate liquid medium such that a colloid is produced; treating the colloid with a chemical or heat to promote coupling of the individual functionalized SWNTs to each other; and heating the coupled SWNTs to evaporate any excess liquid so as to provide a final product comprising an array of covalently bound functionalized SWNTs.

The second embodiment of the invention comprises a method for fabricating of macroscopic two or three dimensionally ordered arrays of single wall nanotubes (SWNTs) comprising the following steps: chemically treating purified SWNTs using known laboratory protocols, comprised of standard organic chemistry techniques, to add chemically reactive groups comprising alcohols or amines to either the tube ends or tube bodies in order to functionalize the SWNTs; applying the sol-gel process to these functionalized carbon nanotubes, which is comprised of the following steps; suspending the functionalized SWNTs in an appropriate liquid medium such that a colloid is produced; treating the colloid with a chemical or heat to promote the covalent bonding of the individual functionalized SWNTs to each other; and heating the coupled SWNTs to evaporate any excess liquid so as to provide a final product comprising an array of covalently bound functionalized SWNTs.

The third embodiment of the invention comprises the above steps coupled with the use of shear stress (a uniaxial applied load) on the "gel"; the stage of sol-gel processing prior to evaporation of the entirety of the liquid, electric fields, and/or magnetic fields to further promote alignment of the carbon nanotubes in the gel stage.

A fourth embodiment of the invention is the inclusion with the above embodiments of a second substance to the sol-gel processing. This substance can be a polymer, epoxy, resin or ceramic material such that introduction of a colloidal suspension of the second substance to the colloidal suspension of the functionalized carbon nanotubes, with subsequent sol-gel processing on the mixture, yield a composite system. This composite system may have both components substantially aligned with respect to one another in a two or three dimensional fashion.

DETAILED DESCRIPTION OF THE INVENTION

Figure 1:
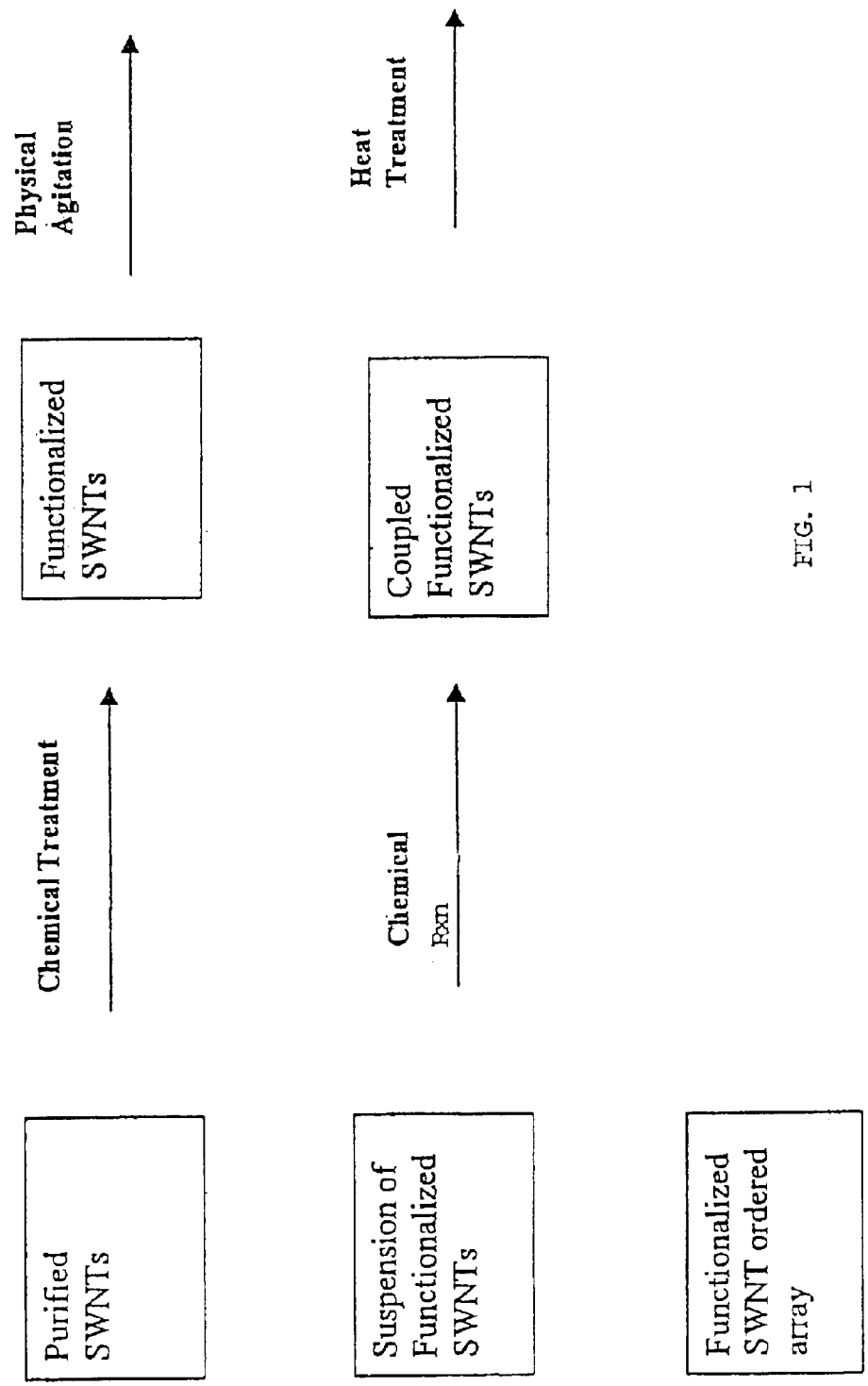
FIG. 1 is a flow diagram of the method of the present invention.
Figure 2:
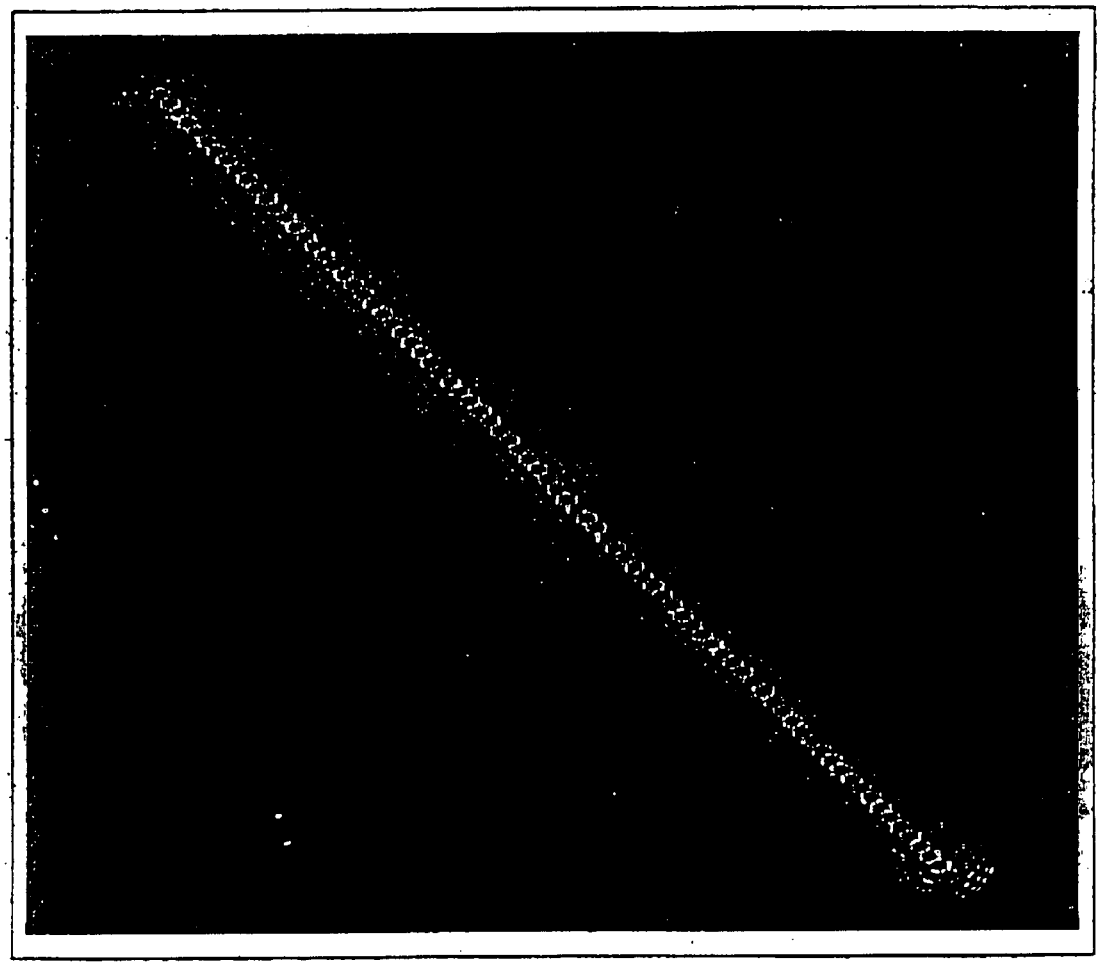
FIG. 2 is the illustration of a nanotubes in accordance with the present invention.

The present invention and method is now described as follows with reference to the attached flow diagram. In a most preferred embodiment, the present invention is directed to a method for using sol gel processing in the production of a macroscopic two or three dimensionally ordered array of carbon nanotubes, either of the multiwall or single wall variety. First, the purified carbon nanotubes are chemically treated using known laboratory protocols, comprised of standard organic chemistry techniques, to add chemically reactive groups to the tube ends and/or tubes body. The reactive groups may be, but are not limited to, primary alcohols and amines. This synthesis is performed using known methods for side wall (tube body) functionalization of the carbon nanotubes and may include further modifications to the synthesis. For purposes of this disclosure, "chemical treatment" or "chemically treated" can include functionalization, (covalent attachment of organic functional groups), adherence of a surfactant molecule or wrapping of a polymer around the body of the tube. The sol gel process, as defined in this patent will include a sol of chemically treated SWNTs using the definition of definition of chemical treatment above.

The functionalized carbon nanotubes (carbon nanotubes with chemical groups attached) are then suspended in an appropriate liquid medium such that a colloid is produced, i.e., a stable suspension of individual functionalized SWNTs. This colloid will be treated with the addition of another chemical or by physical means such as heat to promote condensation or other chemically driven coupling of the individual solid particles (functionalized SWNTs) to each other.

The final step in the processing drives off any excess liquid by heating to leave the final product consisting of an array of functionalized SWNTs covalently bound to another.

SWNTs fabricated according to the present invention will have a number of applications including filtration devices for water purification and physical separation, reinforced fibers and films for military applications, conductive films and paints, composites for automobile panel and airplane fuselages, membranes for batteries, hydrogen storage and biotechnology, and three dimensional composites.

The parameters of the sol gel processing may be modified to control the dimensionality and ordering in the final array. These parameters are defined as the gellation point, heat treatment temperature, concentration, degree, type and space arrangement of the functional groups on the SWNTs.

The present invention has been described with reference to the above detailed description. It is to be noted and stressed that while the present invention has been described in the context of SWNTs, it is applicable to other types of tubes. The true nature and scope of the present invention is to be construed with reference to the claims appended hereto.

What is claimed is:

1. A method for fabricating macroscopic two or three dimensionally ordered arrays of single wall nanotubes (SWNTs) comprising the following steps:
    (a) chemically treating purified SWNTs using known laboratory protocols, comprised of standard organic chemistry techniques, to add chemically reactive groups to either the tube ends or tube bodies in order to functionalize the SWNTs;
    (b) suspending the functionalized SWNTs in an appropriate liquid medium such that a colloid is produced;
    (c) treating the colloid with a chemical or heat to promote coupling of the individual functionalized SWNTs to each other; and
    (d) heating the coupled SWNTs to evaporate any excess liquid so as to provide a final product comprising an array of covalently bound functionalized SWNTs.

2. A method for fabricating macroscopic two or three dimensionally ordered arrays of single wall nanotubes (SWNTs) comprising the following steps:
    (a) chemically treating purified SWNTs using the sol gel process to add chemically reactive groups comprising alcohols or amines to either the tube ends or tube bodies in order to functionalize the SWNTs;
    (b) suspending the functionalized SWNTs in an appropriate liquid medium such that a colloid is produced;
    (c) treating the colloid with a chemical or heat to promote the covalent bonding of the individual functionalized SWNTs to each other; and
    (d) heating the coupled SWNTs to evaporate any excess liquid so as to provide a final product comprising an array of covalently bound functionalized SWNTs.

3. The method of claim 1 including the addition of a polymer, epoxy, resin or ceramic material, such that said polymer, epoxy, resin or ceramic material is added in a stable colloidal form to the colloid of single wall nanotubes, and after the steps comprising claim 1 are perfomed, a composite material is formed which consists of a two or three dimensionally ordered system consisting of carbon nanotubes and a polymer, epoxy, resin or ceramic material.

4. The method of claim 2 including the addition of a polymer, epoxy, resin or ceramic material, such that said polymer, epoxy, resin or ceramic material is added in a stable colloidal form to the colloid of single wall nanotubes, and after the steps comprising claim 2 are performed, a composite material is formed which consists of a two or three dimensionally ordered system consisting of carbon nanotubes and a polymer, epoxy, resin or ceramic material.

5. The method of claim 1 further comprising utilizing a shear stress, an electric field, or a magnetic field on the gel product by condensing either carbon nanotubes to themselves or carbon nanotubes to a polymer, epoxy, resin or ceramic material, such that alignment is promoted in the gel.

* * * * *

UNITED STATES PATENT AND TRADEMARK OFFICE
CERTIFICATE OF CORRECTION

PATENT NO. : 6,749,712 B2
DATED : June 15, 2004
INVENTOR(S) : Cynthia A. Kuper

It is certified that error appears in the above-identified patent and that said Letters Patent is hereby corrected as shown below:

Title page,
Item [54], Title, replace "NONOTUBES" with -- NANOTUBES --.

Column 6,
Line 23, after "final" insert -- gel --.

Signed and Sealed this

Twenty-fourth Day of January, 2006

JON W. DUDAS
*Director of the United States Patent and Trademark Office*